(No Model.)
H. F. & W. RIVARD.
SHEARS.
No. 556,644. Patented Mar. 17, 1896.
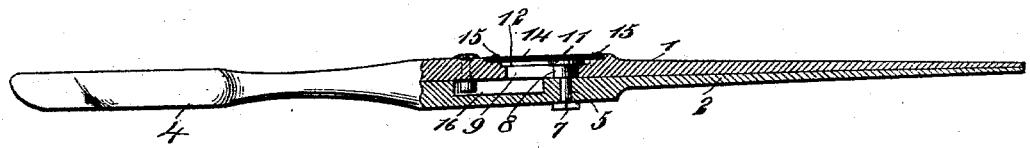
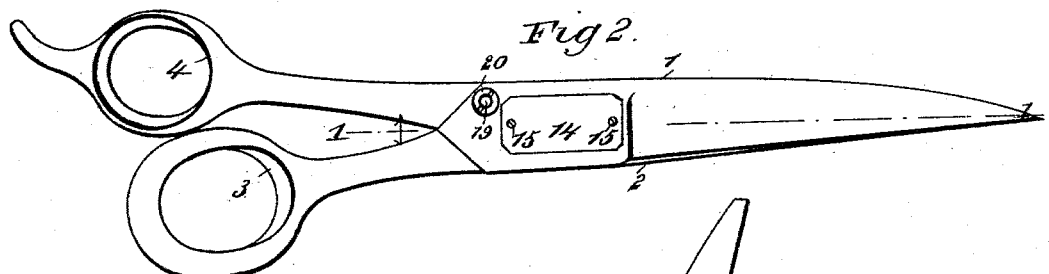
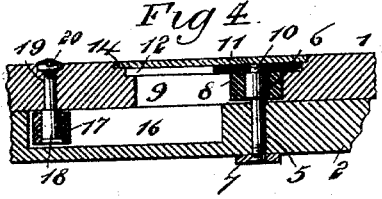
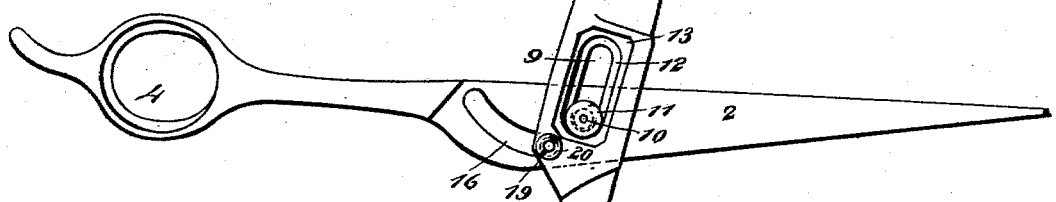
WITNESSES:
INVENTORS
H. F. Rivard
W. Rivard
BY Munn & Co.
ATTORNEYS.

UNITED STATES PATENT OFFICE.

HENRY F. RIVARD AND WILLIAM RIVARD, OF ST. PAUL, MINNESOTA.

SHEARS.

SPECIFICATION forming part of Letters Patent No. 556,644, dated March 17, 1896.

Application filed May 18, 1895. Serial No. 549,831. (No model.)

*To all whom it may concern:*

Be it known that we, HENRY F. RIVARD and WILLIAM RIVARD, of St. Paul, in the county of Ramsey and State of Minnesota, have invented certain new and useful Improvements in Shears, of which the following is a full, clear, and exact description.

This invention relates to certain improvements in scissors or shears of that class wherein the blades are adapted to move or slide longitudinally over one another in cutting in order to more securely and firmly grip the material being cut; and the object of the invention is to provide a device of this character of a novel and inexpensive construction which shall present certain features of novelty and advantages for use over other similar devices heretofore employed, all as will be hereinafter fully set forth.

The novel features of the invention will be carefully defined in the claim.

Reference is to be had to the accompanying drawings, forming a part of this specification, in which similar figures of reference indicate corresponding parts in all the views.

Figure 1 is a longitudinal section taken along the line 1 1 in Fig. 2, showing a pair of shears or scissors provided with our improvements. Fig. 2 is a face view of the same in a closed position. Fig. 3 is a view somewhat similar to Fig. 2, but showing the shears in an open position and with the cover-plate which closes the slot in one of the blades removed to show the interior parts; and Fig. 4 is a fragmentary sectional view somewhat similar to Fig. 1, but on a larger scale.

In the drawings, 1 and 2 represent the blades of the shears, respectively, which are provided with the usual handles 3 4. A pin or shaft 5, having an enlarged head 6, (seen in Fig. 4,) is inserted in an opening in the blade 2, being provided with a screw-threaded lower end adapted to receive a nut 7 screwing thereon, whereby said pin is held in place, and the head 6 of said pin 5 is arranged in position to engage a slot 9 formed in the blade 1 of the shears, being provided with a small roller or sheave 8 adapted to roll freely along said slot 9 in the blade 1, as will be presently described.

The pin 5 is made to extend slightly above the head 6, as indicated at 10 in Fig. 4, and on it is secured a washer or circular retaining-plate 11 adapted to hold the roller or sheave 8 in position, said plate 11 being arranged to play in an enlargement 12 formed at the upper part of the slot 9, as clearly seen in the drawings, and said slot 9 is covered over and concealed by a cover-plate 14 adapted to fit in a recess 13 formed in the blade 1 of the shears, as clearly seen in the drawings, being held in place therein by means of screws 15.

The blade 2 of the shears is provided with a curved slot 16, located behind the pin 5 and adapted to receive a roller or sheave 17, secured on the headed end 18 of a pin or shaft 19 secured in the blade 1 of the shears, as clearly seen in Fig. 4. The pin or shaft 19 is screw-threaded at its extremity to receive a nut 20 screwing thereon, as clearly seen in Fig. 4. In this way it will be seen that the blades 1 and 2 are pivoted together by means of the roller 8, which works in the slot 9, and by reason of the curved slot 16 in the blade 2 and the roller 17 playing therein the blade 1 will be caused to slide longitudinally on the blade 2, as well as to swing pivotally thereon, so as to securely grip the material during the cutting operation.

The construction of our improved shears as above described is very simple and inexpensive, and by reason of the sliding movement of the blades over one another during the cutting the material will be firmly and securely held while being cut.

The shears thus constructed are especially well adapted for barbers' use, since the hair will be gripped and held between the blades and prevented from slipping from the same.

The arrangement of the headed pins 5 and 19 with their heads 6 and 18 each bearing on one side of one of the respective blades of the shears or scissors and their screw-threaded portions passing through said blades and provided with nuts 7 and 20 bearing on the sides of the blades opposite said heads permits each of said pins to be securely clamped to one blade of the shears only, the other blade working on one or the other of the rollers 8 and 17, so that when the blades are opened and closed the pins will not turn or wear loose, as is the case with shears and scissors as ordinarily constructed. At the same time said rollers 8 and 17 are free to turn, their flat surfaces being prevented from being bound against the sides of the blades when the nuts are screwed up by reason of the engagement of the heads 6 and 18 with said blades.

Having thus described our invention, we claim as new and desire to secure by Letters Patent—

The combination of the blades of a pair of shears or scissors provided with openings correspondingly formed through them, a headed pin passed through the opening in one blade and having its head bearing on one side thereof and its end screw-threaded, a nut screwed on the pin on the side of the blade opposite the head of the pin, and arranged to hold said pin against rotative movement on said blade the opening in the other blade being provided with a rabbeted outer edge, a roller loosely carried on the head of the pin and arranged to work loosely in the opening in the other blade, and a washer held on the upper end of said head outside said roller and having a diameter greater than the body portion of the opening, but adapted to fit in the rabbet at the outer edge thereof, substantially as set forth.

HENRY F. RIVARD.
WILLIAM RIVARD.

Witnesses:
FRANK ROBERT, Jr.,
FRED GOSEWISCH.